Fig. 4.

UNITED STATES PATENT OFFICE.

FRANK L. WALTER, OF DAYTON, OHIO, ASSIGNOR TO THE DAYTON ENGINEERING LABORATORIES COMPANY, A CORPORATION OF OHIO.

FORMING-MACHINE.

1,395,935.  Specification of Letters Patent.  Patented Nov. 1, 1921.

Application filed November 21, 1918. Serial No. 263,462.

*To all whom it may concern:*

Be it known that I, FRANK L. WALTER, a citizen of the United States of America, residing at Dayton, county of Montgomery, State of Ohio, have invented certain new and useful Improvements in Forming-Machines, of which the following is a full, clear, and exact description.

This invention relates to machines for turning irregular surfaces, and particularly, for forming the camming surfaces of cams.

In devices of the kind referred to it is the general practice to mount the part on which a camming surface is to be formed upon a rotating spindle, and to provide means for automatically moving the axis of the spindle or the tool relatively to one another through a series of predetermined movements whereby the desired camming surface will be formed. The mechanism for effecting the automatic movement of the work and tool relatively to each other in a predetermined manner generally includes a master cam which is moved in synchronism with the work or the tool, and devices coöperating with the master cam whereby the relative movement between the work and the tool will be properly controlled. It is the general practice to develop the master cam from a precision model of the work to be produced instead of directly constructing the master cam from a predetermined set of dimensions. It is apparent that by working backward from a precision model to develop the master cam by mechanical means, and then using the master cam as the controlling element in the production of the product desired, there is a possibility of many errors creeping in which will result that the work produced will not conform to the precision model or to a predetermined set of dimensions within the required limits.

It is an object of the present invention to provide a machine for forming irregular surfaces such as cams, in which the contour of a controlling master cam is used which is an enlarged scale reproduction of the contour of the cam to be produced.

Another object of the invention is to provide a cam forming machine by means of which the cutting or milling operation, and the grinding operation may be performed.

Other and further objects of the present invention will be apparent from the following description, reference being had to the accompanying drawings, wherein preferred embodiments of the present invention are clearly shown.

Figures 1, 2:
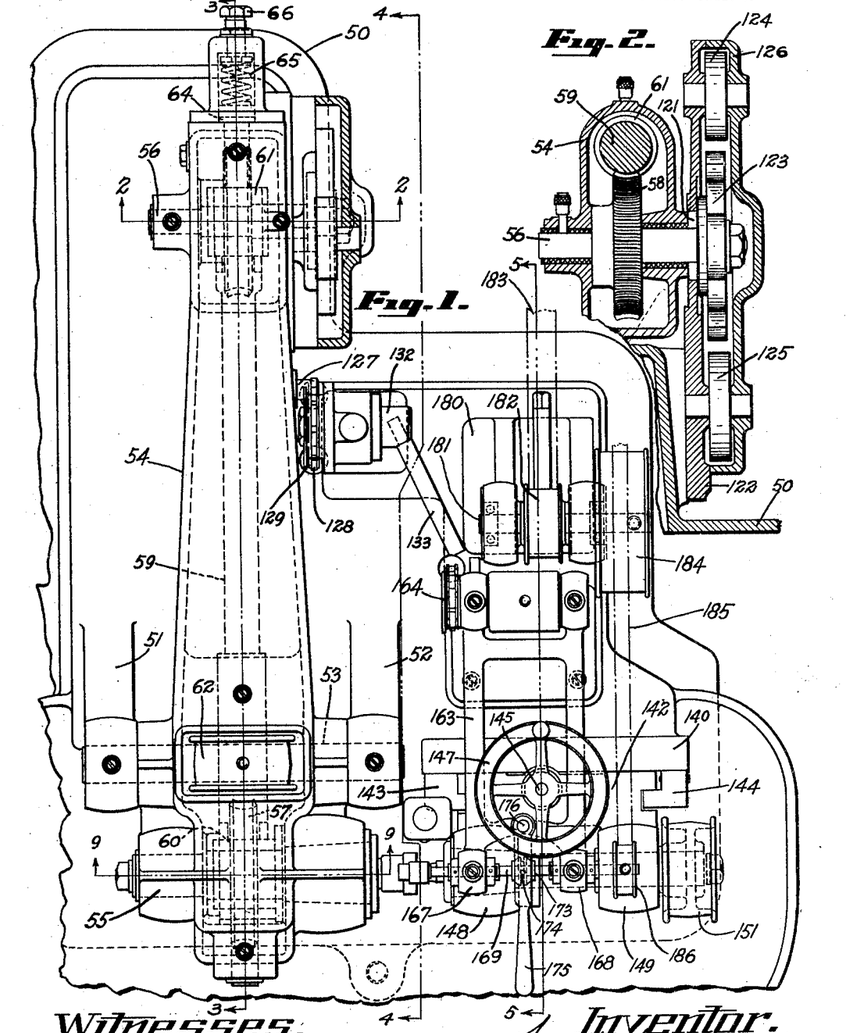
Figure 1 is a plan view of the cam forming machine embodying the present invention.
Fig. 2 is a sectional view taken on the line 2—2 of Fig. 1.
Figure 3:
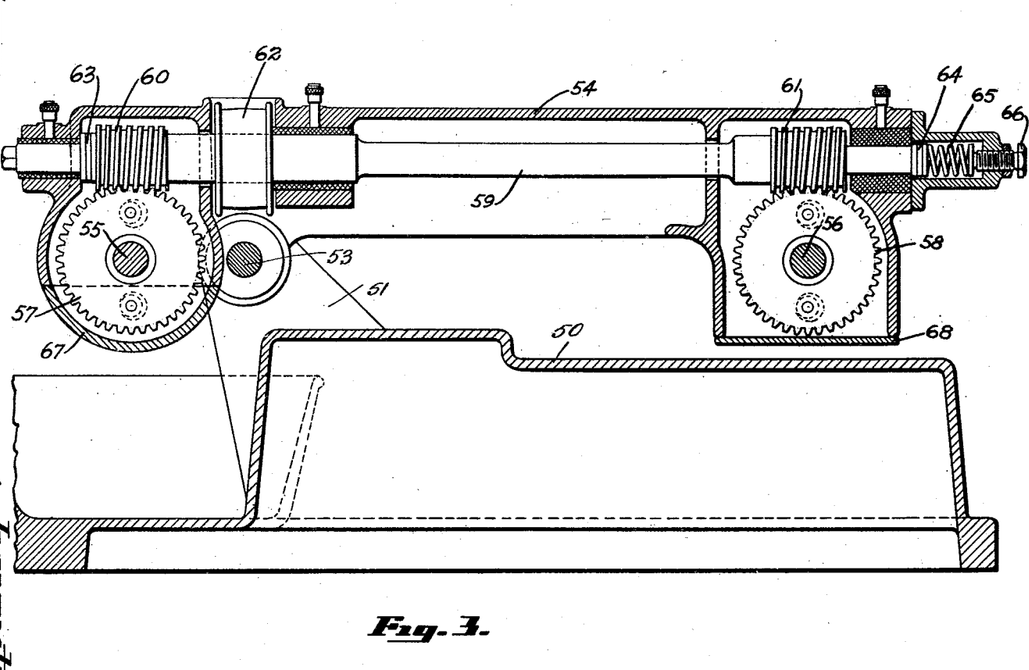
Fig. 3 is a sectional view taken on the line 3—3 of Fig. 1.

Referring to the drawings, 50 designates the base for supporting the various parts of the machine. The base 50 is provided with upstanding arms 51 and 52 upon which is journaled a shaft 53. A swinging frame 54 is mounted upon the shaft 53. Near the end of the shorter arm of the frame 54 is journaled the work spindle 55, and near the end of the longer arm of the swinging frame 54 is journaled the master cam spindle 56. A worm wheel 57 is mounted on the work spindle 55, and worm wheel 58 is mounted on the master cam spindle 56. A worm gear shaft 59 extending at right angles to the shafts 55 and 56 is also journaled upon the swinging frame 54, and carries a worm gear 60 meshing with the worm wheel 57 and a worm gear 61 meshing with the worm wheel 58. A pulley 62 is mounted on the shaft 59, and is adapted to receive a belt having connection with the source of power, not shown. A thrust bearing 63 is interposed between the gear 60 and the frame 54, and a thrust bearing 64 is interposed between the shafts 59 and a spring 65, one end of which presses against a screw 66 carried by the frame 54. By virtue of the arrangement of the thrust bearings and spring any lost motion which would occur by reason of endwise movement of the shaft 59 is prevented. Cover plates 67 and 68 are secured upon the frame 54 for the purpose of forming practically dust-proof housings for the gearing shown in Fig. 3.

Referring to Figs. 9 to 14, certain details of the work spindle will be described. The work spindle 55 is journaled in a plain bearing 70 and a tapered bearing 71. A nut 72ª having screw threaded engagement with the shaft 55 serves to take up any play between the shaft 55 and its bearings. The gear 57 includes a half gear member 72 which is connected with the shaft 55 and a half gear member 73 which is pivotally mounted upon the member 72, and connected therewith by means of screws 74 and 75 having screw threaded portions engaging tapped holes which are diametrically opposite one another in the member 73. These screws 74 and 75 are provided with tapered heads which pass through tapered holes formed in the half gear member 72, said tapered holes not being exactly diametrically opposite. By adjusting the screws 74 and 75, the gear 73 may be shifted angularly with relation to the half gear member 72 in order to take up any lost motion existing between the worm gear 60 and the worm wheel 57. The worm wheel 58 is constructed in the same manner, so that all lost motion can be taken up between the shafts 55 and 56.

Figures 9, 10, 11, 12, 13, 14:
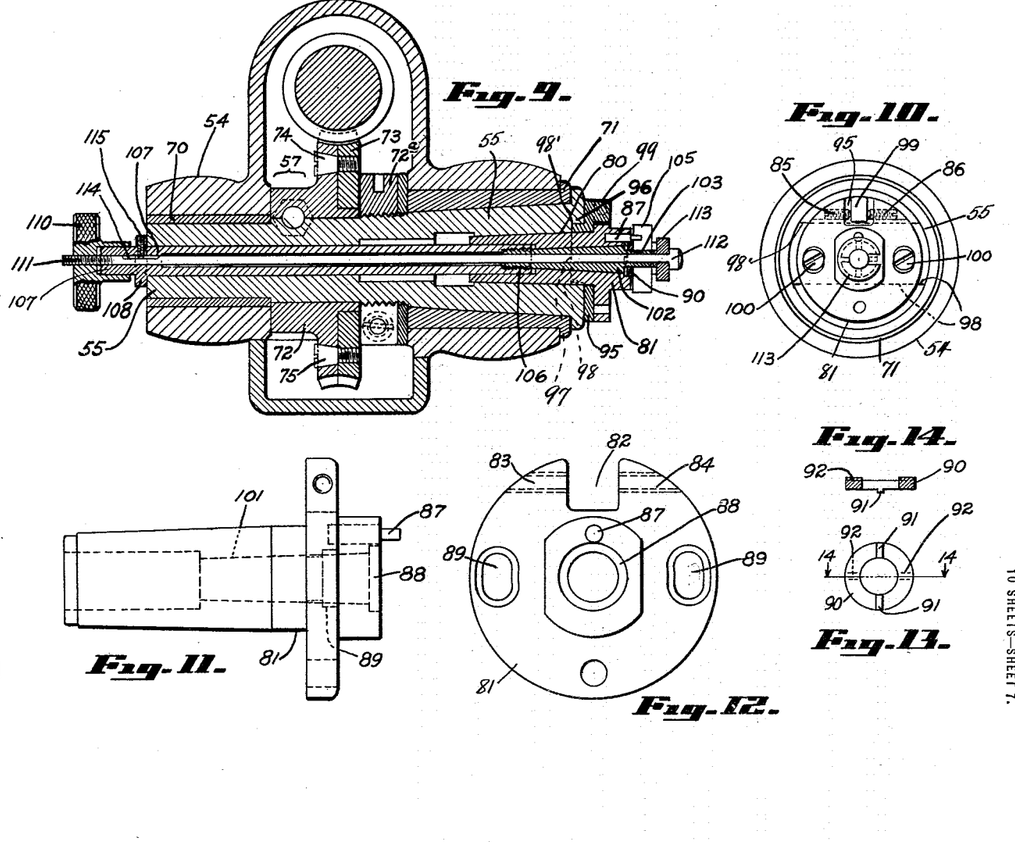
Fig. 9 is a section taken on the line 9—9 of Fig. 1.
Fig. 10 is a side elevation of certain parts shown in Fig. 9.
Fig. 11 is a side elevation of the work holding sleeve.
Fig. 12 is an end view of the parts shown in Fig. 11.
Fig. 13 is a plan view on an enlarged scale of an equalizing member shown in Fig. 9.
Fig. 14 is a sectional view taken on the line 14—14 of Fig. 13.

The shaft 55 is provided with an internally tapered portion 80 which receives a work locating sleeve 81. The sleeve 81 is provided with a notch 82 and with tapped holes 83 and 84 for receiving set screws 85 and 86. The sleeve 81 is provided with a locating stud 87, and with a recess 88 for receiving an equalizing washer 90.

The washer 90 is provided with lugs 91 and 92 which are diametrically opposite, the lugs 91 being located at right angles to the lugs 92 and upon the opposite side of the washer 90.

A locating plate 95 is positioned between the shaft 55 and the locating sleeve 81, and is provided with a boss 96 having parallel side edges extending into the shaft 55 provided with groove 97 having corresponding parallel sides 98 and 98' by means of which a driving connection between the shaft 55 and said plate 95 is effected. The plate 95 is provided with a lug 99 which projects into the notch 82 formed in the sleeve 81. Referring to Fig. 10 it will be seen that by adjusting screws 85 and 86 the angular relation between the sleeve 81 and the shaft 55 can be effected, whereby to adjust the location of the work rotated by the shaft 55. Screws 100 passing through elongated holes 89 in the sleeve 81 and having screw threaded engagement with the locating plate 95, serve to assist in maintaining the sleeve 81 in adjusted position.

The sleeve 81 is provided with an internally tapered portion 101 which receives the centering sleeve 102 having a reduced end portion 103 which projects through the washer 90. This end portion 103 passes through the center hole in the part 105 to be formed. The stud 87 projects into a locating hole previously formed in the part 105.

The inner end of the centering sleeve 102 is provided with a screw threaded portion 106 which engages with an internally screw threaded portion formed in one end of a clamping sleeve 107 which passes through the shaft 55 and is provided with a hexagonal shoulder 108 formed preferably integrally therewith by means of which the sleeve may be turned to clamp the tapered sleeves 81 and 102 in position with respect to the shaft 55.

A hand nut 110 is journaled upon the sleeve 107 and has screw threaded engagement with a clamping rod 111 which passes entirely through the sleeves 107 and 102. Said rod 111 is provided with a head 112 which is located beyond the work part 105. A C-washer 113 is located on the rod 111 between the work part 105 and the head 112. The rod 111 is provided with a keyway 114 into which projects a set screw 115 carried by the sleeve 107.

It will be seen that by turning the hand nut 110 in a clockwise direction as viewed from the left of Fig. 9, the clamping rod 111 will be moved to the left, as viewed in Fig. 9 causing the work 105 to be securely clamped in position.

If the center hole formed in the work part 105 is not exactly perpendicular to its plane surfaces the work part 105 might become distorted or dis-centered if clamped directly against the end of the sleeve 81. To eliminate this possibility the equalizing washer 90 is provided.

Figure 4:
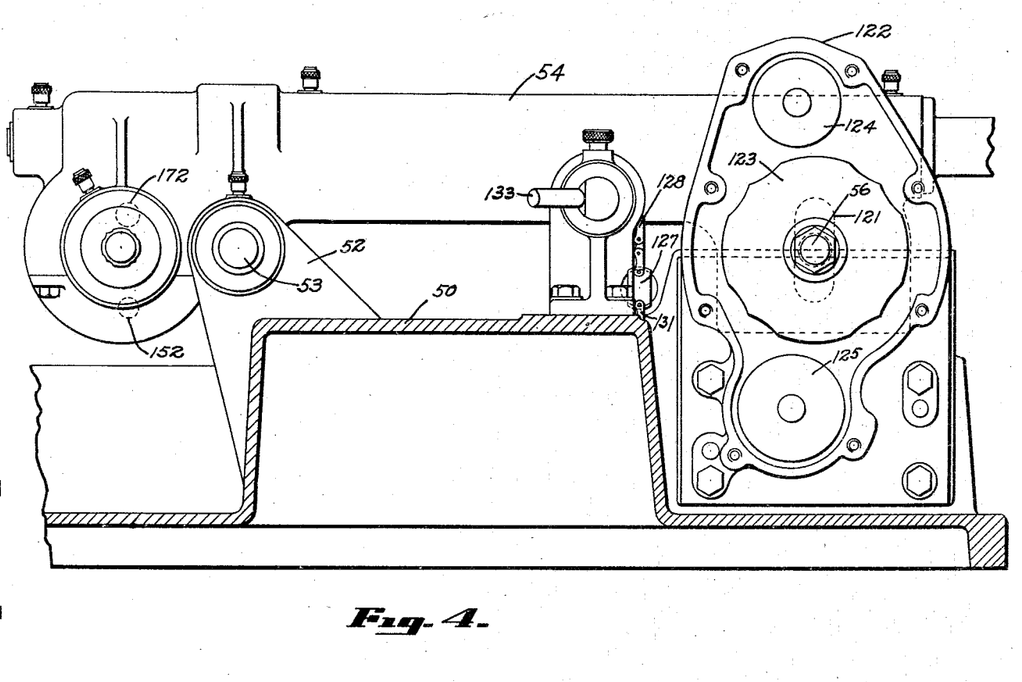
Fig. 4 is a sectional view taken on the line 4—4 of Fig. 1.

The shaft 56 projects through an elongated hole 121 formed in a bracket 122 which is carried by the base 50. The shaft 56 carries the master cam 123 which is adapted to engage, by the swinging of the frame 54 upon rollers 124 and 125 which are journaled upon the bracket 122 and the bracket cover plate 126. Bracket 122 and its cover 126 form a master cam housing, said cam 123 being arranged to cover the opening 121 in either of its positions.

Figures 5, 6:
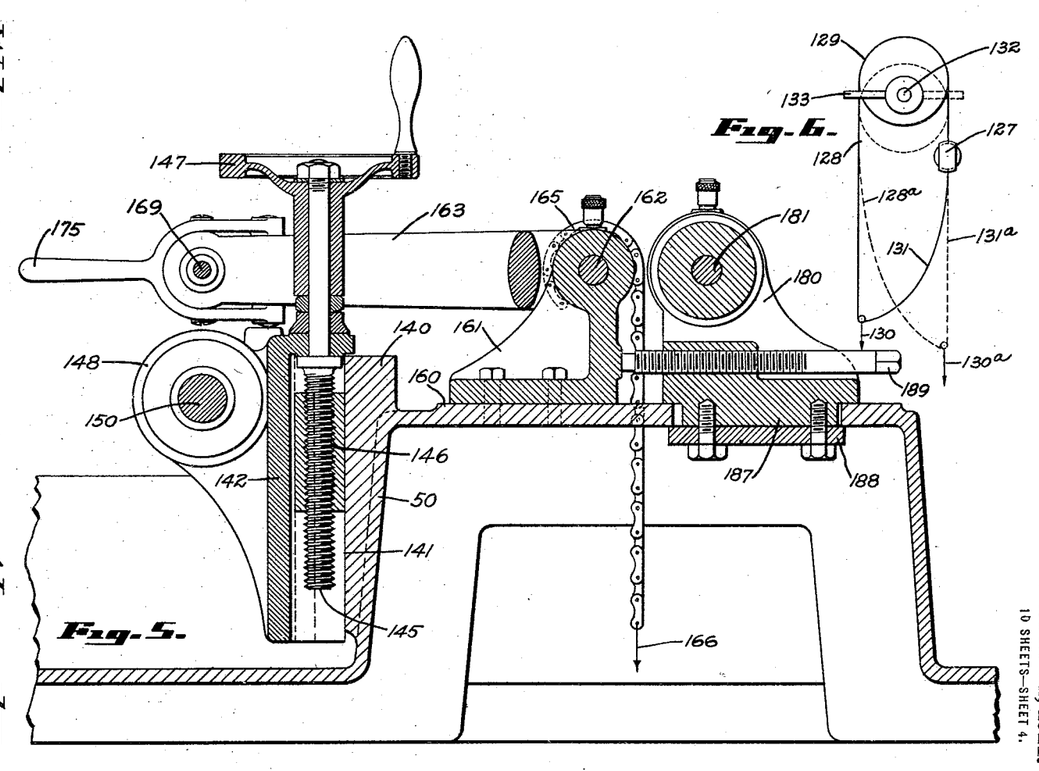
Fig. 5 is a sectional view taken on the line 5—5 of Fig. 1.
Fig. 6 is a diagrammatic side view of the mechanism for shifting the work to position for operation by the cutting tool, or to position for operation by the grinding wheel.

In order to maintain the sam 123 in engagement with either of the rollers 124 and 125 there is provided an outwardly projecting lug 127 which is carried by the frame 54. Referring to Fig. 6, this lug 127 is connected with one end of a chain 128 which passes around a pulley 129 and carries at its other end a weight indicated by the arrow 130. A second chain 131 is connected with the weight 130 and the lug 127. The pulley 129 is mounted eccentrically with respect to a shaft 132 which is provided with a lever 133. When the lever 133 is shifted into the full line position shown in Fig. 6, the weight 130 will be shifted to the left of a vertical plane passing through the axis of the shaft 132. The chain 128 will be held taut by the weight 130 and will cause the lug 127 and consequently the frame 54 to move in a counter clockwise direction as viewed in Fig. 4, thereby swinging the cam 123 into engagement with the roller 124. If lever 133 is shifted to the dotted line position shown in Fig. 6 the chains 128 and 131 and the weight 130 will be shifted to the positions 128ª, 131ª and 130ª respectively, as indicated by dotted line in Fig. 6.

When this occurs the chain 131 will be held taut while the chain 128 is loose, as a result of the swinging of the weight 130 to the right of a plane passing vertically through the axis of the shaft 132. The weight 130 will then cause the lug 127 and consequently the frame 54 to swing downwardly thereby swinging the cam 123 into engagement with the roller 125.

The swinging of the frame 54 in the manner described is done for the purpose of bringing the work part 105 into proper relation with the tools by means of which the work is to be shaped to produce a reduced scale reproduction of the master cam 123.

Figure 7:
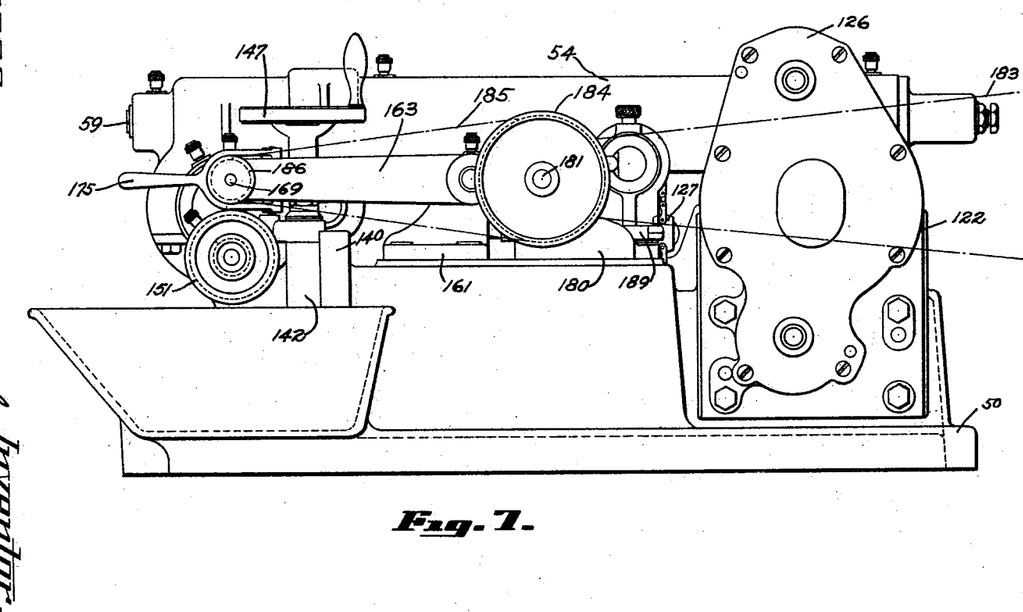
Fig. 7 is a side elevation of the machine shown in Fig. 1.
Figure 8:
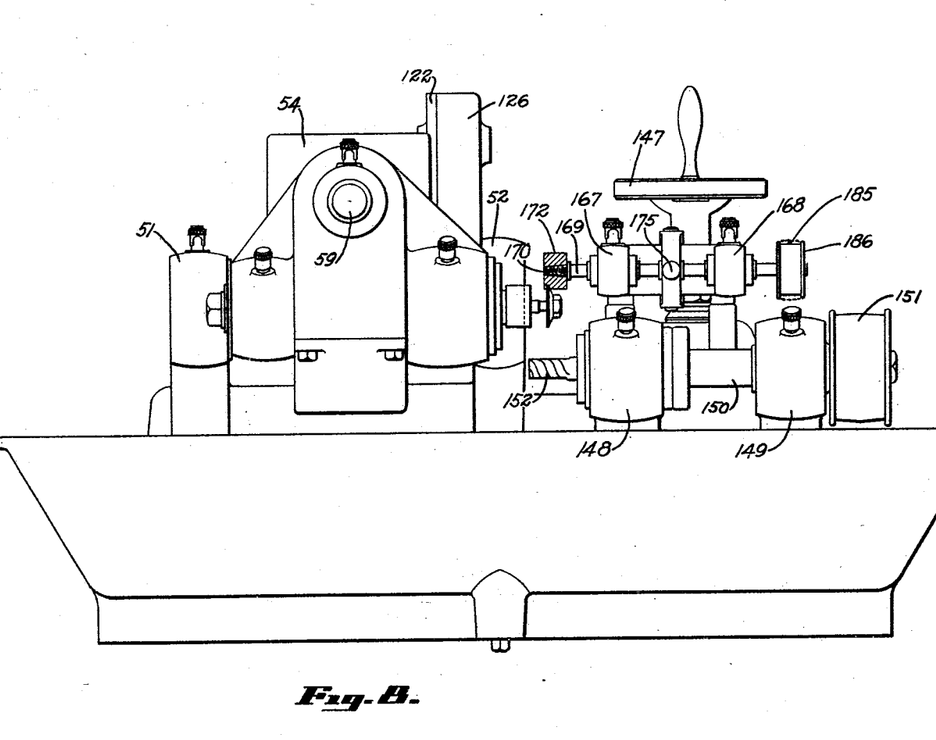
Fig. 8 is a front elevation of the machine shown in Fig. 1.

Referring to Figs. 1, 5 and 7 the frame 50 is provided with a pad 140 having a vertical plane surface 141 against which bears an apron 142 having sliding engagement with guide blocks 143 and 144 which are carried by the pad 140. The apron 142 carries a screw 145 which engages a nut 146 mounted upon the pad 140. The screw 145 is provided with a hand wheel 147 by means of which said screw 145 may be turned to raise or lower the apron 142 with respect to the base 50. The apron 142 is provided with outwardly projecting arms 148 and 149 in which is journaled a cutter shaft 150 carrying at one end a driving pulley 151 and at the other a cutting tool 152.

Referring to Fig. 5 the frame 50 is provided with a pad 160 upon which is mounted a bracket 161 carrying a shaft 162, upon which is mounted for rotation therewith grinding wheel frame 163. The shaft 162 has fixed thereon a pulley 164 to which one end of a chain 165 is attached which carries a weight located at its lower end indicated by the arrow 166. The weight 166 serves to counter-balance the weight of the frame 163 and the parts carried thereby.

The frame 163 is provided with arms 167 and 168 upon which is journaled the grinding wheel shaft 169 having a screw threaded end 170 upon which grinding wheel 172 (indicated by the circle in Fig. 4) is mounted. The shaft 169 is provided with a grooved collar 173 into which projects a pin 174 carried by a forked lever 175 which is pivoted at 176 upon the frame 163. By shifting the lever 175 the shaft 169 may be moved longitudinally to bring all parts of the periphery of the grinding wheel 172 into engagement with the work part 105.

Upon the pad 160 there rests a bracket 180 upon which is journaled a shaft 181 carrying a belt 183 which is connected by means of a pulley 182 with a source of power not shown. The shaft 181 carries a wide faced pulley 184 connected by means of a belt 185 with a pulley 186 carried by the grinding wheel shaft 169. The bracket 180 is provided with a lug 178 which projects through an opening in the frame 50. A plate 188 is secured upon the lower surface of the lug 187 and coöperates with the frame 50 so as to permit the horizontal sliding movement of the bracket 180 with respect to the frame 50, but will not prevent vertical movement. A screw 189 having engagement with the bracket 180 abuts against the bracket 161. It will be seen that by turning the screw 189 in clockwise direction as viewed from the right of Fig. 5, the bracket 180 may be moved to the right in order to tighten the belt 185.

Figure 15:
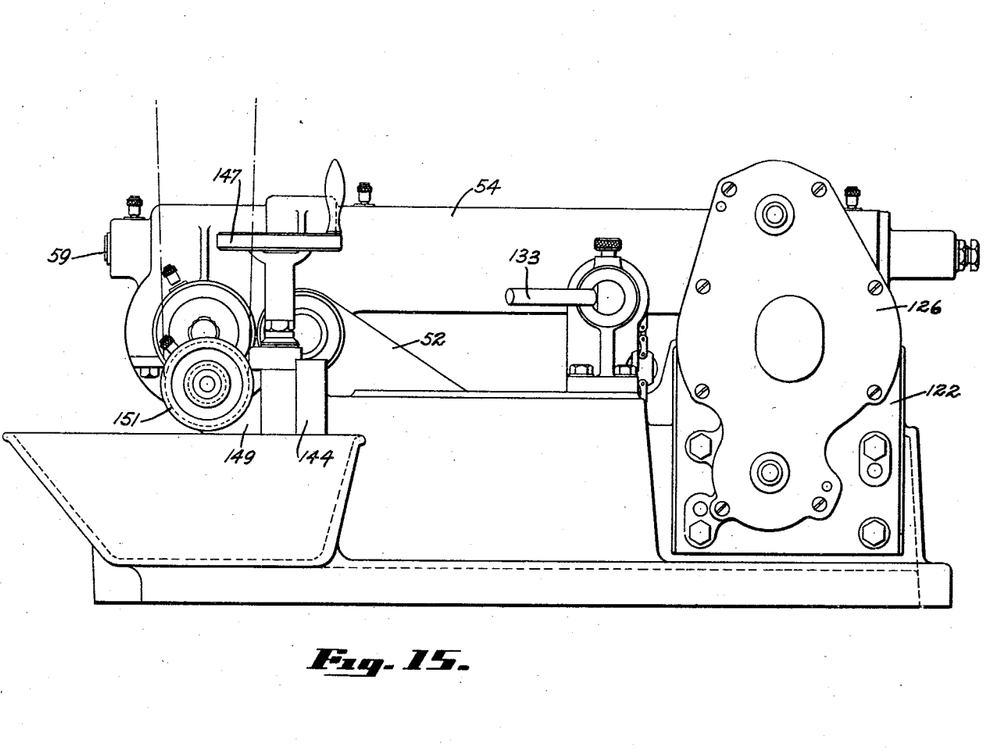
Fig. 15 is a side elevation of a modified form of the invention.

The modified form of the invention shown in Fig. 15 is the same as the first form of the invention just described, with the exception that the grinding wheel spindle has been removed. The machine shown in Fig. 15 is therefore adapted only for the cutting or milling operation.

Figure 16:
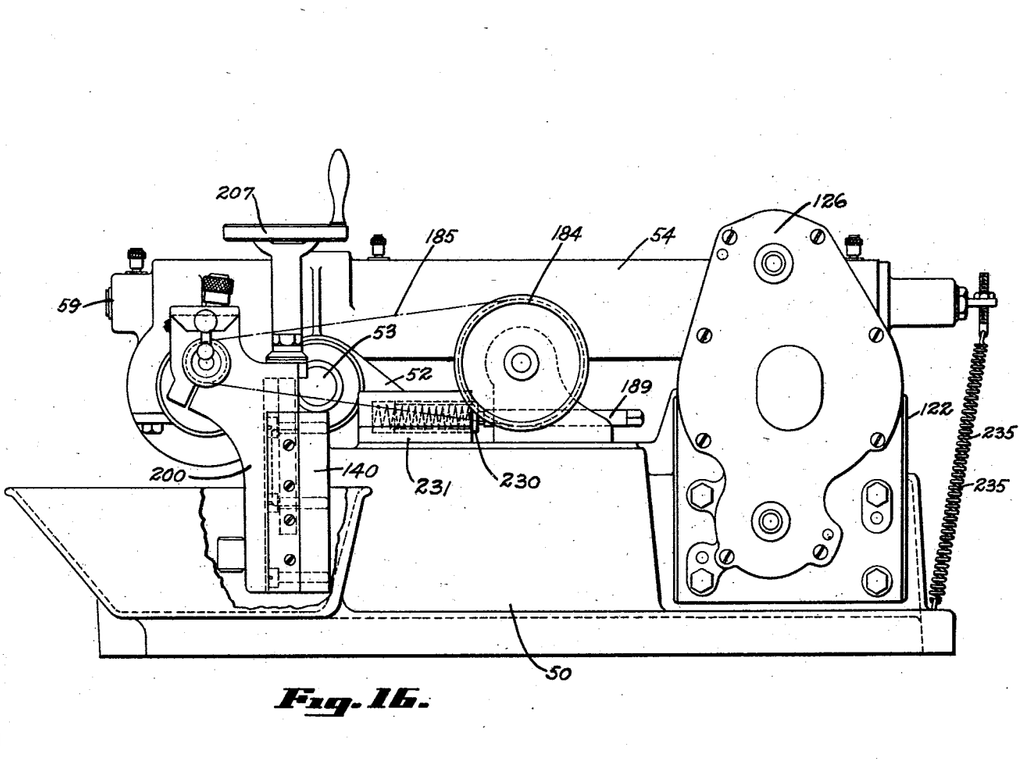
Fig. 16 is a side elevation of a further modified form of the invention.
Figure 17:
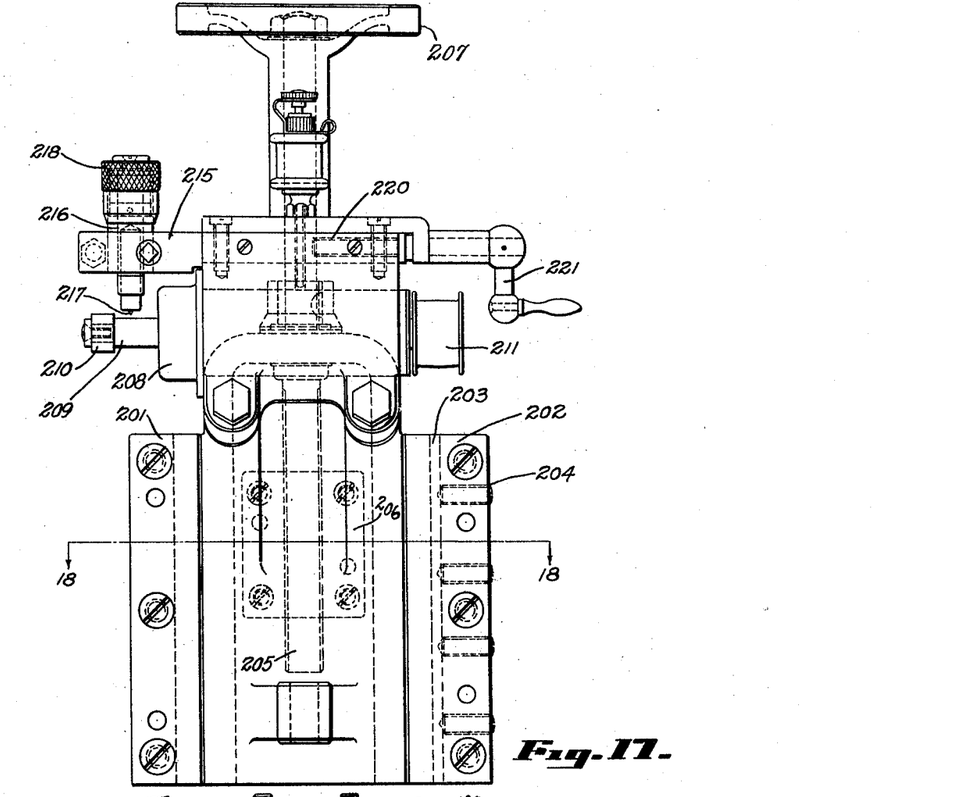
Fig. 17 is a front elevation of certain parts shown in Fig. 16.
Figure 18:
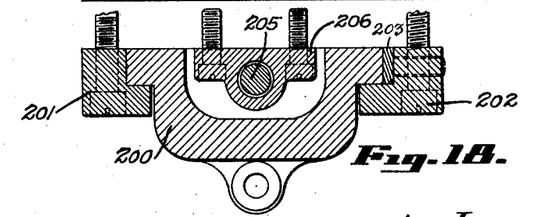
Fig. 18 is a sectional view taken on the line 18—18 of Fig. 17.

The modified form of the invention shown in Fig. 16 differs from the first form of the invention described, in that the milling or cutting tool has been removed. This form of the invention is adapted for performing the grinding operation only, and includes a modified form of device for supporting the grinding wheel shaft as shown in Figs. 17 and 18.

An apron 200 bears against the pad 140 formed on the frame 50, and is supported thereon for vertical sliding movement by means of guides 201 and 202. A gib 203 and set screws 204 are provided for taking up play between the apron and the guides. The apron 200 carries a screw 205 which coöperates with a nut 206 supported on the pad 140. The screw 205 is provided with a hand wheel 207 by means of which the apron may be raised or lowered. The apron 200 supports a bearing 208 upon which is journaled a grinding wheel shaft 209 carrying at one end a grinding wheel 210 and at the other, a pulley 211. The pulley 211 is adapted to be connected by means of the belt 185 with the wide faced pulley 184 which has been described in connection with the first form of the invention. The apron 200 supports for sliding movement a plate 215 carrying a micrometer screw 216 having at its lower end a diamond point 217. Said screw 216 may be turned by means of a milled head 218. A screw 220 supported by the apron 200 has threaded engagement with the plate 215, and is provided with a hand crank 221 by means of which the screw 220 may be turned to move the plate 215 in horizontal direction. It will be seen that by turning the hand crank 221 in a counter clockwise direction as viewed in Fig. 17 the plate 215 will be moved to the left with respect to Fig. 17 to cause the diamond point 217 to move across the face of the grinding wheel 210. This last named operation is necessary to maintain the grinding surface of the wheel true with respect to its axis of rotation. By turning the milled head 218 the diamond point 217 may be brought nearer to the axis of the wheel 210.

In this form of the invention the belt tightening screw 189 abuts against a spring pressed plunger 230 having sliding engagement with a stop block 231 secured upon the base 50. In this manner the tension in the belt 185 may be increased, but at the same time the belt will be held in a yielding tension.

In order to maintain the master cam 123 in engagement with the roller 125 during the grinding operation a spring 235 is provided and connected at one end with the base 50 and at the other end with the swinging frame 54.

In the embodiments of the invention described the ratio of the long arm of the swinging frame 54 to the short arm is 5 to 1. The contour of the master cam 123 is an exact reproduction of the desired contour of the product and having its dimensions as regards to the cam surface, five times the required dimensions of the camming surface of the finished product. When power is applied to the shaft 59, it is apparent that shafts 55 and 56 will be rotated, and if the cam 123 is in engagement with either the rollers 124 or 125 the axis of the shaft 56 will be given a series of movements in predetermined sequence whereby corresponding movements will be imparted to the axis of the shaft 55, these latter movements having an amplitude equal to one fifth the amplitude of the movements of the shaft 56. The cutting tool or the grinding wheel will be located in a position with respect to the work part 105 corresponding to the positions occupied by the rollers 125 or 124 with respect to the master cam 123. In this manner it will be apparent that the contour of the work part 105 will be formed into an exact reproduction of the contour of the master cam but on a reduced scale.

It is evident that by using a machine constructed as described, a master cam can be formed directly in accordance with a predetermined set of dimensions which bear the same ratio to the dimensions of the product required. It will be apparent that any inaccuracies which may exist in the dimensions of the contour of the master cam will be reduced to one fifth in the finished product. If greater accuracy be required it is apparent that different proportions between the arms of the swinging frame 54 could be obtained, for instance 10 to 1, and a master cam could be provided having its dimensions ten times the dimensions of the required product. In this way the inaccuracies of the master cam would be still further minimized.

It will be apparent that the camming surface required can be more accurately formed by means of the present invention than by means of previously known devices in which the master cam is developed by mechanical means from a precision model, and with a result that the inaccuracies existing in the precision model or in the mechanism for developing the master cam from the precision model, will be multiplied in accordance with the relative sizes of the cam and the precision model.

Where the first form of the invention described is employed, it will be understood that the cutting or milling operation is performed first to reduce the work piece to the approximate shape of the desired cam, after which the swinging frame is moved in a clockwise direction so that the cam 123 engages with the roller 124. With the cam in this position the work piece will be in position for operation by means of the grinding wheel which will still further reduce the work piece to the exact shape.

While the forms of the mechanisms herein shown and described constitute preferred forms of embodiments of the invention, it is to be understood that other forms might be adopted, all coming within the scope of the claims which follow.

I claim—

1. In a forming machine, the combination with a tool holder and a rotatable work holder; of means for producing a predetermined series of movements of the axis of the work holder relatively to the tool holder, said means including a cam rotating in synchronism with the work holder, the contour of said cam being an enlarged scale reproduction of the desired contour of the finished product of the machine.

2. In a forming machine, the combination with a tool holder; of a movably mounted frame; a movable work holder carried by said frame; and movable cam carried by said frame, the contour of said cam being an enlarged scale production of the contour of the desired finished product, means for imparting motion to the cam and work holder so that the cam moves in synchronism therewith; and a stationary follower against which the cam bears so that the frame may be given a series of movements in predetermined sequence.

3. In a forming machine, the combination with a tool holder; of a pivotally mounted frame; a rotatable work holder journaled upon the frame; a rotatable cam journaled upon the frame, the contour of said cam being an enlarged scale reproduction of the desired contour of the finished product; means for imparting motion to the cam and work holder so that the cam rotates in synchronism therewith; and a stationary follower against which the cam bears so that the frame may be given a series of oscillatory movements in predetermined sequence.

4. In a forming machine, the combination with a tool holder; of a pivotally mounted frame; parallel shafts rotatably mounted on the frame; a work holder carried by one shaft; a cam carried by the other shaft, the contour of said cam being an enlarged scale reproduction of the desired contour of the finished product of the machine; worm wheels carried by the shaft; a worm shaft provided with gearing connecting said worm wheels; a stationary cam follower; and means for maintaining the cam in engagement with the follower whereby the frame may be given a series of oscillatory movements in predetermined sequence.

5. In a forming machine, the combination with a plurality of tool holders; of a rotatable work holder; means for bringing the work holder into position to be operated upon by either of the tools; and means for producing a series of translatory movements of the axis of the work holder relatively to any of the said tools in predetermined sequence.

6. In a forming machine, the combination with a plurality of tool holders; of a rotatable work holder; means for bringing the work holder into position to be operated upon by either of the tools; and means for producing a series of translatory movements of the axis of the work holder relatively to any of the said tools in predetermined sequence, said means including a cam and a plurality of cam followers into engagement with which the cam may be brought by the operation of the first named means.

7. In a forming machine, the combination with a plurality of tool holders; of a pivotally mounted frame; a rotatable work holder journaled upon the frame; a rotatable cam journaled upon the frame; the contour of said cam being an enlarged scale reproduction of the desired contour of the finished product; means for imparting motion to the cam and work holders so that the cam rotates in synchronism therewith; a plurality of stationary cam followers against either of which the cam may be brought into engagement by swinging the pivotally mounted frame so that said frame may be given a series of oscillatory movements with predetermined sequence; and means for causing the cam to be placed in engagement with either of said followers.

8. In a forming machine, the combination with a plurality of tool holders; of a pivotally mounted frame; a rotatable work holder journaled upon the frame; a rotatable cam journaled upon the frame, the contour of said cam being an enlarged scale reproduction of the desired contour of the finished product; means for imparting motion to the cam and work holders so that the cam rotates in synchronism therewith; a plurality of stationary cam followers against either of which the cam may be brought into engagement by swinging the pivotally mounted frame so that said frame may be given a series of oscillatory movements with predetermined sequence; means for causing the cam to be placed in engagement with either of said followers, said last named means including a weight and devices for attaching the weight to the frame; and means for shifting the weight and the attaching devices whereby the weight will cause the cam to move into engagement with one or the other of said cam followers.

9. In a forming machine, the combination with a tool holder and a rotatable work holder; of means for producing a series of translatory movements in predetermined sequence of one of said holders with respect to the other, said means including a cam having a contour which is an enlarged scale reproduction of the desired contour of the finished product of the machine; gearing between the cam and the work holder providing for the rotation of the cam in synchronism with the work spindle; and means for taking up lost motion in the gearing between the cam and the work holder.

10. In a work holder for forming machines, the combination with a tubular work spindle; of means for centering and locating the work with respect to the spindle; and means for clamping the work in position upon the spindle including a clamping rod having a head smaller in diameter than the center hole in the work, said rod extending through the spindle and having a threaded end, a C-washer adapted to be located between the head of the rod and the work, and a clamping nut engaging with the threaded end of said rod.

11. In a work holder for forming machines, the combination with a work spindle; of means for centering and locating the work with respect to the spindle; means for clamping the work on the spindle; and an equalizing member located between the work and the spindle whereby said work clamping means will be prevented from dis-centering the work with respect to the spindle.

12. In a forming machine, the combination with a tool holder and a rotatable work holder; of means for producing a series of translatory movements in predetermined sequence of the work holder with respect to the tool holder, said means including a cam having a contour which is an enlarged scale reproduction of the contour of the product of the machine; spiral gearing between the same and the work holder, certain of said spiral gears being composed of relatively angularly displaceable half gears; and means for adjusting one of the half gears with respect to the other to take up lost motion in said gearing.

13. In a forming machine, the combination with a tool holder and a rotatable work holder; of means for producing a series of translatory movements in predetermined sequence of the work holder with respect to the tool holder, said means including a cam having a contour which is an enlarged scale reproduction of the contour of the product of the machine; spiral gearing between the cam and work holder, certain of said spiral gears being composed of relatively angularly displaceable half gears; and means for adjusting one of the half gears with respect to the other including taper-headed screws passing through non-diametrically opposed tapered holes in one of the half gears and having screw threaded engagement with diametrically opposed threaded holes in the other half gear.

14. In a forming machine, the combination with a tool holder and a rotatable work holder; of means for producing a predetermined series of movements of the axis of the work holder relatively to the tool holder, said means including a cam rotating in synchronism with the work holder, the contour of said cam being an enlarged scale reproduction of the desired contour of the finished product of the machine; and means for moving the tool holder transversely to the axis of the work holder.

15. In a forming machine, the combination with a tool holder; of a movably mounted frame; a movable work holder carried by said frame; and movable cam carried by said frame, contour of the said cam being an enlarged scale production of the desired contour of the finished product; means for imparting motion to the cam and work holder so that the cam moves in synchronism therewith; and a stationary follower against which the cam bears so that the frame may be given a series of movements in predetermined sequence; and means for moving the tool holder transversely to the axis of the work holder.

16. In a forming machine, the combination with a plurality of tool holders; of a rotatable work holder; means for bringing the work holder into position to be operated upon by either of the tools; and means for producing a series of translatory movements of the axis of the work holder relatively to any of the said tools in predetermined sequence; and means for moving the tool holders transversely to the axis of the work holder.

17. In a forming machine, the combination with a plurality of tool holders; of a rotatable work holder; means for bringing the work holder into position to be operated upon by either of the tools; and means for producing a series of translatory movements of the axis of the work holder relatively to any of the said tools in predetermined sequence, said means including a cam and a plurality of cam followers into engagement with which the cam may be brought by the operation of the first named means; and means for moving the tool holders transversely to the axis of the work holder.

18. In a forming machine, the combination with a tool holder; of a pivotally mounted frame providing gear housings; parallel shafts mounted on said frame and each extending through one of said housings; an intermediate shaft extending into said housings; gearing in said housings connecting said parallel shafts with said intermediate shaft; a stationary cam follower; a master cam on one of said parallel shafts; and a work holder on the other parallel shaft.

19. In a forming machine, the combination with a tool holder; of a pivotally mounted frame; parallel shafts mounted on said frame; gearing connecting said shafts; a work holder on one of said parallel shafts; a stationary housing into which the other parallel shaft projects; a master cam carried by said other shaft and located within said housing; and a cam follower located within said housing.

20. In a forming machine, the combination with a tool holder; of a pivotally mounted frame; parallel shafts mounted on said frame, gearing connecting said shafts; a work holder on one of said parallel shafts; a stationary housing provided with an elongated opening through which the other of said shafts projects; a master cam carried by said other shaft and located within said housing; a plurality of cam followers located within said housing; and means for causing said cam to be placed in engagement with either of said followers, said cam being arranged to cover said housing opening in either of its positions.

21. In a forming machine, the combination with a tool holder; of a movable mounted work spindle, a master cam for controlling the movements of the work spindle; gearing between the cam and spindle provided with means for taking up lost motion; and means for adjustably locating the work upon the work spindle and providing a positive drive between the work and the spindle.

22. In a work holder for forming machines, the combination with a work spindle; of a work locating device; means for clamping said device longitudinally of the spindle; means for adjusting said device angularly of said spindle and providing a positive drive between the work and the spindle; and means for clamping the work upon the device.

23. In a work holder for forming machines, the combination with a work spindle; of a work locating sleeve having a locating stud for projecting into a locating hole in the work; means for clamping the locating sleeve upon the spindle and including provisions for centering the work; and means for clamping the work in fixed relation to the locating sleeve.

24. In a work holder for forming machines, the combination with a work spindle; of a work locating sleeve having a locating stud for projecting into a locating hole in the work; means for clamping the locating sleeve longitudinally upon the work spindle and including provisions for centering the work; means for adjusting the sleeve angularly of the spindle and providing a positive drive between the sleeve and spindle; and means for clamping the work in fixed relation to the locating sleeve.

25. In a work holder for forming machines, the combination with a hollow work spindle; of a work locating sleeve taper-telescoping into said spindle, and carrying a locating stud; a centering sleeve taper-telescoping into said locating sleeve and provided with a work centering projection; a clamping member extending into said spindle and having screw-threaded engagement with the locating sleeve whereby to clamp both said sleeves into engagement with said spindle; and means for clamping the work longitudinally of said sleeves.

26. In a work holder for forming machines, the combination with a hollow work spindle; of a work locating sleeve taper-telescoping into said spindle, and carrying a locating stud; a centering sleeve taper-telescoping into said locating sleeve and provided with a work centering projection; a clamping sleeve extending into said spindle and having screw-threaded engagement with the locating sleeve whereby to clamp said sleeves into engagement with said spindle; a clamping rod extending through said work and said sleeves; and a clamping nut coöperating with said rod.

27. In a work holder for forming machines, the combination with a hollow work spindle; of a work locating sleeve taper-telescoping into said spindle, and carrying a locating stud; a centering sleeve taper-telescoping into said locating sleeve and provided with a work centering projection; a clamping sleeve extending into said spindle and having screw-threaded engagement with the locating sleeve whereby to clamp said sleeves into engagement with said spindle; means providing a positive drive from the spindle to the locating sleeve and including provisions for adjusting the sleeve angularly of the spindle.

In testimony whereof I affix my signature.

FRANK L. WALTER.

Witnesses:
J. W. McDONALD,
M. A. PEARE.